No. 770,859. PATENTED SEPT. 27, 1904.
C. F. HUDSON, I. H. FEINBERG & S. L. SIEGEL.
APPARATUS FOR MIXING AND KNEADING DOUGH.
APPLICATION FILED MAY 3, 1904.
NO MODEL.
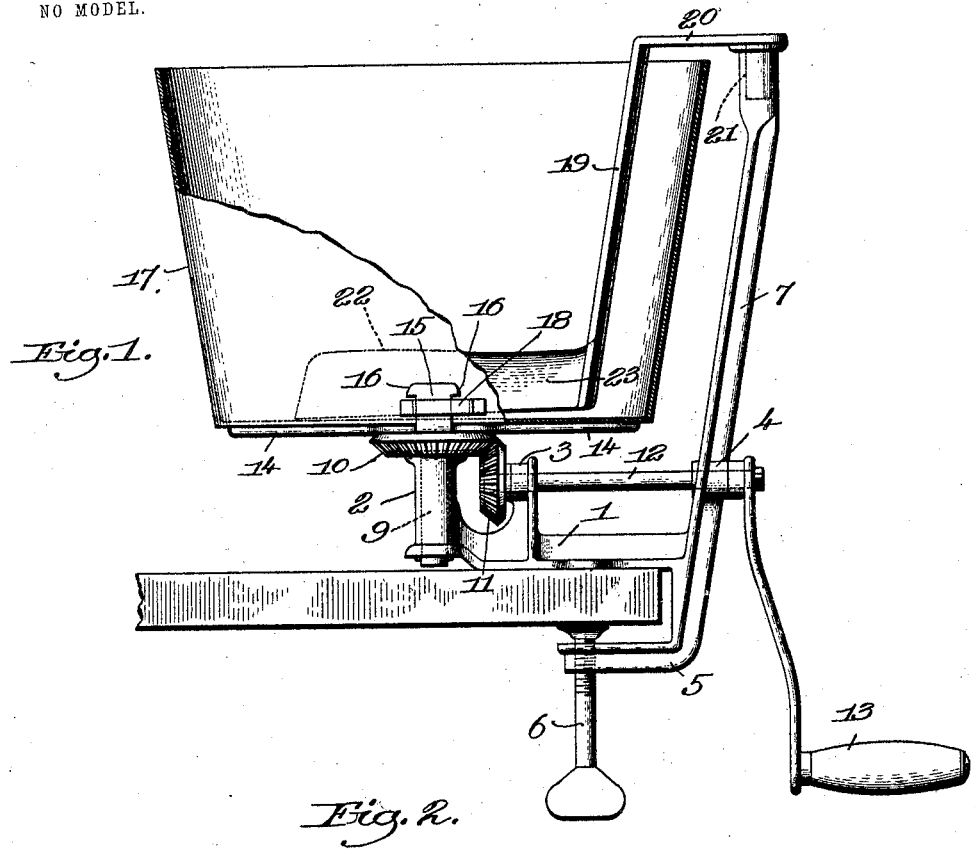
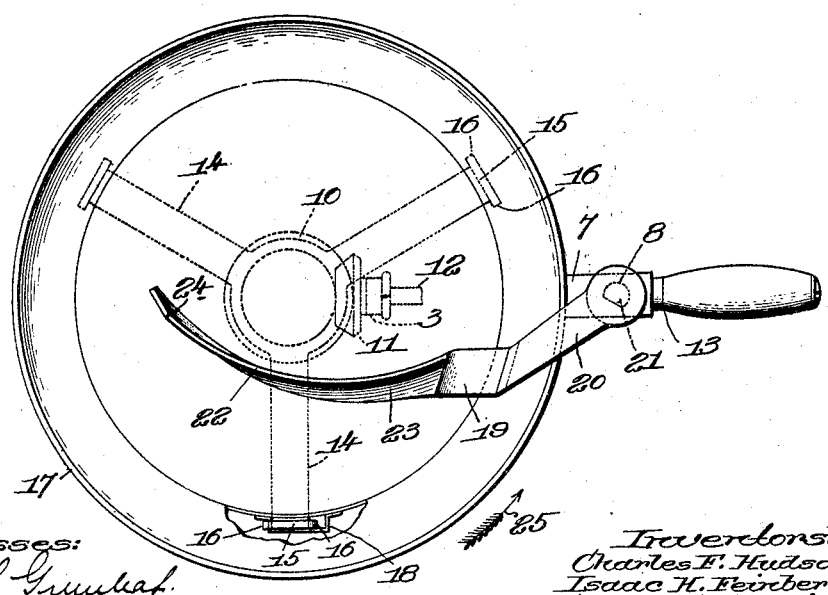
Witnesses:
Fred S. Greenleaf
S. Wm. Lutton
Inventors:
Charles F. Hudson,
Isaac H. Feinberg,
Samuel L. Siegel,
by Crosby Gregory Attys.

No. 770,859.

Patented September 27, 1904.

UNITED STATES PATENT OFFICE.

CHARLES F. HUDSON, ISAAC H. FEINBERG, AND SAMUEL L. SIEGEL, OF BOSTON, MASSACHUSETTS, ASSIGNORS TO SUMNER MANUFACTURING COMPANY, OF BOSTON, MASSACHUSETTS, A CORPORATION OF MASSACHUSETTS.

APPARATUS FOR MIXING AND KNEADING DOUGH.

SPECIFICATION forming part of Letters Patent No. 770,859, dated September 27, 1904.

Application filed May 3, 1904. Serial No. 206,133. (No model.)

*To all whom it may concern:*

Be it known that we, CHARLES F. HUDSON, ISAAC H. FEINBERG, and SAMUEL L. SIEGEL, citizens of the United States, and residents of Boston, county of Suffolk, State of Massachusetts, have invented an Improvement in Apparatus for Mixing and Kneading Dough, of which the following description, in connection with the accompanying drawings, is a specification, like characters on the drawings representing like parts.

This invention has for its object the production of a simple and efficient apparatus for mixing and kneading dough, &c., whereby the labor and time required are very materially reduced and the mixing and kneading effected in a most thorough manner.

The novel features of our invention will be fully described in the subjoined specification and particularly pointed out in the following claims.

Figure 1 is a side elevation of a mixing apparatus embodying one form of our invention, the pan-wall being broken out to show a portion of the blade and its support, and Fig. 2 is a top or plan view of the apparatus.

As shown best in Fig. 1, a stand 1, having an upright sleeve-bearing 2 and separated and alined bearings 3 4 at right angles thereto, is provided with a clamping-arm 5 to extend beneath the leaf of a table T or other support, the stand being clamped thereto by a clamp-screw 6 in an obvious manner. The stand has an upturned rigid arm 7, in which the bearing 4 is formed, the upper end of the arm having a socket 8 therein (see dotted lines, Figs. 1 and 2,) for a purpose to be described, said socket being shown as partly circular in cross-section, as in Fig. 2. A short upright shaft 9 is rotatably mounted in the bearing 2 and has an attached bevel-gear 10, in mesh with a similar gear 11, fast on a long shaft 12, rotatably mounted in the bearings 3 4, said shaft 12 having secured to its outer end a suitable operating-handle 13. The gear 10 has secured to it a spider, whose radial arms 14 are upturned at their outer ends at 15, and we have shown said upturned ends as provided with lateral locking-lugs 16 adjacent their tops, and, as best shown in Fig. 1, two oppositely-extended lugs are formed on each. A mixing-pan 17 is adapted to be seated upon and supported by the spider, the upturned ends 15 of the arms projecting close to the sides of the pan, which latter has a series of external loops 18 long enough to slip down over each upturned end 15, as shown, and by giving a relative rotative movement to pan and spider one lug 16 of each pair will project over the end of its adjacent loop and lock the pan from lifting. When the operator turns the shaft 12 by means of the crank arm or handle 13, the gears 11 and 10 will impart a rotary motion to the spider and pan locked thereto.

A blade-carrier 19 is laterally bent at its upper end at 20 and provided with a downturned pin 21 to enter the socket 8 and connect the carrier and arm 7, the pin corresponding in cross-section to the socket, so as to prevent any swinging movement of said carrier. The latter is extended into the pan near its side, and at its lower end the carrier has rigidly attached to it a blade 22, curved longitudinally and also twisted in the direction of its length to present oppositely-inclined faces 23 24 (see Fig. 2) adjacent its ends. The lower edge of the blade is located very close to the pan-bottom, and the length of the blade is such that its ends are at opposite sides of the pan center. The preferred direction of rotation of the pan is in the direction of arrow 25, Fig. 2, and when the dough is placed in the pan and the latter is rotated by the means described the inclined face 23 of the blade acts to scrape up the dough and cause it to rise over such face and drop on the opposite side of the blade. This portion of dough is in turn presented to the blade-face 24 and lifted thereover, falling onto the bottom of the pan to again be acted upon by the blade, as described, this operation being repeated again and again as the pan is rotated, so that the dough is thoroughly mixed and kneaded by the action described. When the working of the batch of dough is completed, the blade is removed by withdrawing the blade-carrier, detaching the pin 21 from the socket 8, and the pan can then be removed by giving it a partial turn to unlock the loops 18 from the lugs 16. If the pan is rotated in the direction opposite to arrow 25, the mixing and kneading will still be effected, but the blade will operate in a manner the reverse of that hereinbefore described.

We have shown a simple device for detachably connecting the blade-carrier and arm 7; but any other suitable form of detachable connection may be used which will hold the blade-carrier and blade rigidly in operative position. The lower edge of the blade is located so close to the pan-bottom that the rotation of the latter will cause a thin sheet of the dough to be squeezed or pressed between the blade and bottom of the pan, one portion after another of the batch of dough being thus subjected to pressure. This acts to knead the dough while the mixing is effected by the apparatus in the manner set forth, and it will be manifest that the kneading action is very thorough, for the dough is pulled or stretched out into a thin portion and then squeezed beneath the blade by the forward movement of the pan-bottom. As the blade and pan-bottom are rigid with relation to each other, the dough is subjected to a compressive as well as a pulling and stretching action, resulting in effective kneading.

Various changes in details of construction of the apparatus shown may be made by those skilled in the art without departing from the spirit and scope of our invention.

Having fully described our invention, what we claim as new, and desire to secure by Letters Patent, is—

1. In apparatus of the class described, a pan, means to rotate it, a fixed, upturned arm adjacent the pan, a blade-carrier detachably connected therewith and extended into the pan eccentric to its axis of rotation, and a mixing-blade on the lower end of the carrier close to the pan-bottom, the lower edge of the blade being curved longitudinally and lying in a plane parallel to the bottom of the pan.

2. In apparatus of the class described, a pan, means to rotate it, a stationary blade-carrier extended into the pan, and a longitudinally-curved and twisted blade rigidly secured to said carrier at its lower end, the lower edge of the blade lying in a plane parallel to and adjacent the pan-bottom.

3. In apparatus of the class described, a pan, means to rotate it, a fixed, upturned arm outside and adjacent the pan, a blade-carrier detachably connected therewith and extended into the pan, and a curved blade rigidly secured to the lower end of the carrier and twisted to present oppositely-inclined faces at its ends, the lower edge of the blade being in a plane adjacent the pan-bottom.

4. In apparatus of the class described, a spider having its arms upturned at their outer ends, means to rotate it, a pan adapted to be seated upon the spider and provided with external loops to receive the upturned ends of said arms, a fixed, upturned arm adjacent the pan, a blade-carrier detachably connected therewith and extended into the pan eccentric to its axis of rotation, and a curved and twisted mixing-blade fast on the lower end of the carrier and adjacent the pan-bottom.

5. In apparatus of the class described, a spider having its arms upturned at their outer ends, means to rotate it, a pan adapted to be seated upon the spider and provided with external loops to receive the upturned ends of said arms, means to lock the pan to the arms and retain it in position on the spider, a stationary blade-carrier extended into the pan, and a curved blade rigidly secured to the lower end of the carrier and twisted to present oppositely-inclined faces at opposite sides of the center of the pan.

6. In apparatus of the class described, a spider having its arms upturned at their outer ends, a lateral locking-lug on each upturned end, means to rotate the spider, a pan adapted to rest upon the spider and having external loops to receive the upturned ends of the arms, the locking-lugs projecting over the loops to prevent lifting of the pan, a fixed, upturned arm adjacent the pan and having a socket in its upper end, a blade-carrier provided with a projection to enter the socket, said carrier extending into the pan at one side of its center, and a curved blade rigidly secured to the lower end of the carrier adjacent the pan-bottom.

In testimony whereof we have signed our names to this specification in the presence of two subscribing witnesses.

CHARLES F. HUDSON.
ISAAC H. FEINBERG.
SAMUEL L. SIEGEL.

Witnesses:
JOHN C. EDWARDS,
ELIZABETH R. MORRISON.